United States Patent [19]

Stokes

[11] Patent Number: 5,590,944
[45] Date of Patent: Jan. 7, 1997

[54] PROJECTABLE TIMER

[76] Inventor: William T. Stokes, 1125 Robin Way, Sunnyvale, Calif. 94087

[21] Appl. No.: 40,538

[22] Filed: Mar. 30, 1993

Related U.S. Application Data

[63] Continuation-in-part of Ser. No. 724,200, Jul. 1, 1991, abandoned, which is a continuation of Ser. No. 400,158, Aug. 28, 1989, Pat. No. 5,035,502.

[51] Int. Cl.$^6$ ................................................. G09B 19/00
[52] U.S. Cl. ..................... 353/122; 353/DIG. 3; 434/394
[58] Field of Search .......................... 353/28, 119, 122, 353/DIG. 3; 362/23; D10/1, 5, 15; 434/304, 394, 365; 364/705.07

[56] References Cited

U.S. PATENT DOCUMENTS

| | | | |
|---|---|---|---|
| 4,149,257 | 4/1979 | Nakagiri et al. | 364/705.07 |
| 4,836,786 | 6/1989 | Wong | 353/DIG. 3 |
| 5,035,502 | 7/1991 | Stokes | 353/122 |
| 5,168,294 | 12/1992 | Davis et al. | 353/DIG. 5 |

FOREIGN PATENT DOCUMENTS

| 0165637 | 7/1987 | Japan | 353/DIG. 5 |
|---|---|---|---|

*Primary Examiner*—William C. Dowling
*Attorney, Agent, or Firm*—Thomas M. Freiburger

[57] ABSTRACT

An electronic timing device has a transparent liquid crystal display for use on an overhead projector, for projecting a large image of the LCD numerals on a screen or wall of a classroom, for timing of tests or other activities. The timer has a plastic casing, various function keys, a solar cell and/or battery, other internal electronics and a transparent liquid crystal display. Foldable legs of the timer, when open, maintain the timer a set distance above the light stage of the projector so as to prevent the LCD from overheating. One of the foldable legs, in the closed position, serves as protection and as a reflective backing for the LCD, so that the timer can function as a desk top LCD clock in the closed position. The timing device can function as a clock or timer in various modes.

14 Claims, 4 Drawing Sheets

PROJECTABLE TIMER

REFERENCE TO RELATED APPLICATIONS

This application is a continuation-in-part of application Ser. No. 724,200, filed Jul. 1, 1991, and now abandoned, which was a continuation of application Ser. No. 400,158, filed Aug. 28, 1989, now U.S. Pat. No. 5,035,502.

BACKGROUND OF THE INVENTION

This invention relates generally to clocks and timers, and in particular to timing devices for use in the educational classroom.

Timing devices, and particularly electronic timing devices, are well known in several fields. However, typical timing devices, especially those which function predominantly in stop watch mode, have small displays, not readily viewed by a large number of people in a classroom type setting. While large clocks have been standard in classrooms for some time, these clocks typically do not function as timers or stop watches. Large display timers are available, as for sporting events, but generally are too costly to be provided in every school classroom, especially where such an item is not the subject of daily use in the classroom.

A projecting alarm clock has previously been marketed which projects a digital time readout upwardly, onto the ceiling of a room. The image projected is dim, suitable for use only in a darkened room. Intended for bedroom use, the clock allows a user merely to look at the ceiling to see the time, without rolling over in bed to read a clock. The projectable alarm clock has a built-in light source for projection, seemingly not employing an LCD for projection. Instead, the clock apparently uses a mechanical template to project lighted numerical images. It is believed limited to a fixed narrow focus range corresponding to approximately six or seven feet. As compared to the purposes and functions of the present invention, the projecting alarm clock lacks several features, including not functioning as a stop watch or timer and not being compatible with an overhead projector. Additionally, the clock is relatively bulky and mechanically complex.

Overhead projectors are commonly used in classrooms for displaying information to a classroom. Such overhead projectors are commonplace in most schools, serving as standard equipment. The vast majority of teachers in the United States are familiar with overhead projectors, and frequently use them in class demonstrations.

While overhead projectors are typically used for viewing transparencies, other devices have been designed for overhead projector use. Calculators have been designed for overhead projector use, whereby the calculator has a transparent liquid crystal display so that when the calculator is placed on an overhead projector the LCD display is projected onto a wall or screen. See Judd U.S. Pat. No. 4,154,007. In some overhead projector calculators the keyboard section is also transparent, facilitating classroom demonstrations of the use of the calculator. See, for example, Stokes U.S. Pat. No. 5,035,502. Such overhead projectable calculators take advantage of the wide availability of overhead projectors.

There is a need for a timing device which is inexpensive, small and portable, and capable of producing a large scale display visible to an entire classroom. Accordingly, it is an object of the present invention to provide a timing device adapted so its timing read-out can be readily projected for group viewing with an overhead projector. A further object is to provide a timing device which is rugged, designed to withstand dropping and heat, and versatile in being useful in a secondary mode as a desk top clock or timer.

SUMMARY OF THE INVENTION

In accordance with the present invention, a small, portable electronic timing device is provided with a transparent LCD, so that the timing device may be placed on an overhead projector, with the LCD display being projected in large size on a wall or screen.

The small, hand held timing device of this invention comprises an electronic timer, having various keys for setting and controlling the timer functions. Additionally, in one embodiment the timing device also has a regular clock mode, whereby the timer may function as a regular desk top clock.

The projectable timer of the invention has a liquid crystal display, transparent and unobstructed from front to back of the device, so that light may pass through the transparent section. When particular segments of the liquid crystal display are activated, the excited liquid crystal material becomes opaque so as to become in projection a dark shadow element. Thus, when the device is placed on an overhead projector, the display of the timing device can be projected at enlarged size on a projection screen so as to be visible to a large number of observers, e.g. a classroom.

To prevent overheating of the LCD, which could lead to LCD failure, a preferred embodiment of the invention is provided with an elevating means to support the timer at a raised position above the light stage of the overhead projector. The elevating means may be in the form of folding legs on the timer's housing which, when extended, allow air freely to circulate under the timer. This, as described in the referenced U.S. Pat. No. 5,035,502, reduces heat buildup in the LCD which would otherwise be caused by the heat from the overhead projector.

The timing device may be powered by a photovoltaic cell so as to draw its power directly from light generated by the overhead projector itself. In a further embodiment of the invention, the device is powered by batteries or a combination of rechargeable batteries charged by photovoltaic cells.

In a further embodiment of the invention, the timing device has a panel hinged to the back of the casing, so that the panel may be swung out. In the closed position, the panel provides a backing behind the transparent LCD so that the LCD display may be directly and easily viewed without the overhead projector. The hinged panel may have a reflective surface as a backing for the liquid crystal display, to further enhance direct viewing of the LCD display so that it appears similar to a conventional LCD. When the panel is open, light from an overhead projector can pass through the LCD display, so that the LCD may be projected on the wall or a screen. The hinged panel in the open position may form one of the elevating legs.

The timing device may further include a hinged desk stand attached to the casing, which when opened can support the timer in a generally upright, preferably angled position. This allows the timer to be used as a regular desk clock or desk top timer when not used on an overhead projector.

The timing device may be equipped with a built-in buzzer or other audible alarm, which is activated when the students' time has run out or at other particular times. In a further embodiment of the invention, the timer may be used in conjunction with a small flashing strobe light, which can be connected through a plug-in wire to the timing unit, wherein the timing unit activates the flashing strobe instead of (or in addition to) an audible alarm. Such a flashing strobe may be used in situations where an audible alarm is undesirable or ineffective, such as in classes for hearing-impaired students.

Thus, in one embodiment a projectable timing device in accordance with the invention, for use on an overhead projector, includes a casing with clock timing means for clocking progression of time for a selected interval. Clock set means are included on the casing for enabling a user to select and set a desired interval of time on the clock timing means, with activation means on the casing for enabling the user to start the timing interval. A liquid crystal display is secured in the casing, connected to the clock timing means so as to display the setting of the desired interval of time as well as the progression of time over the selected interval. The liquid crystal display is transparent through the casing so as to be projectable on the light stage of an overhead projector. The timing device therefore enables the start, progression and end of a timing interval to be displayed to a classroom or group.

It is therefore a principal object of the invention to provide a timing device which is inexpensive, small and portable, and compatible with standard overhead projectors so that its display may be viewed by a large group in a classroom setting, as well as being useful in another mode as a desk top clock. These and other objects, advantages and features of the invention will be apparent from the following description of the preferred embodiments, considered along with the accompanying drawings.

DESCRIPTION OF PREFERRED EMBODIMENTS

Figure 1:
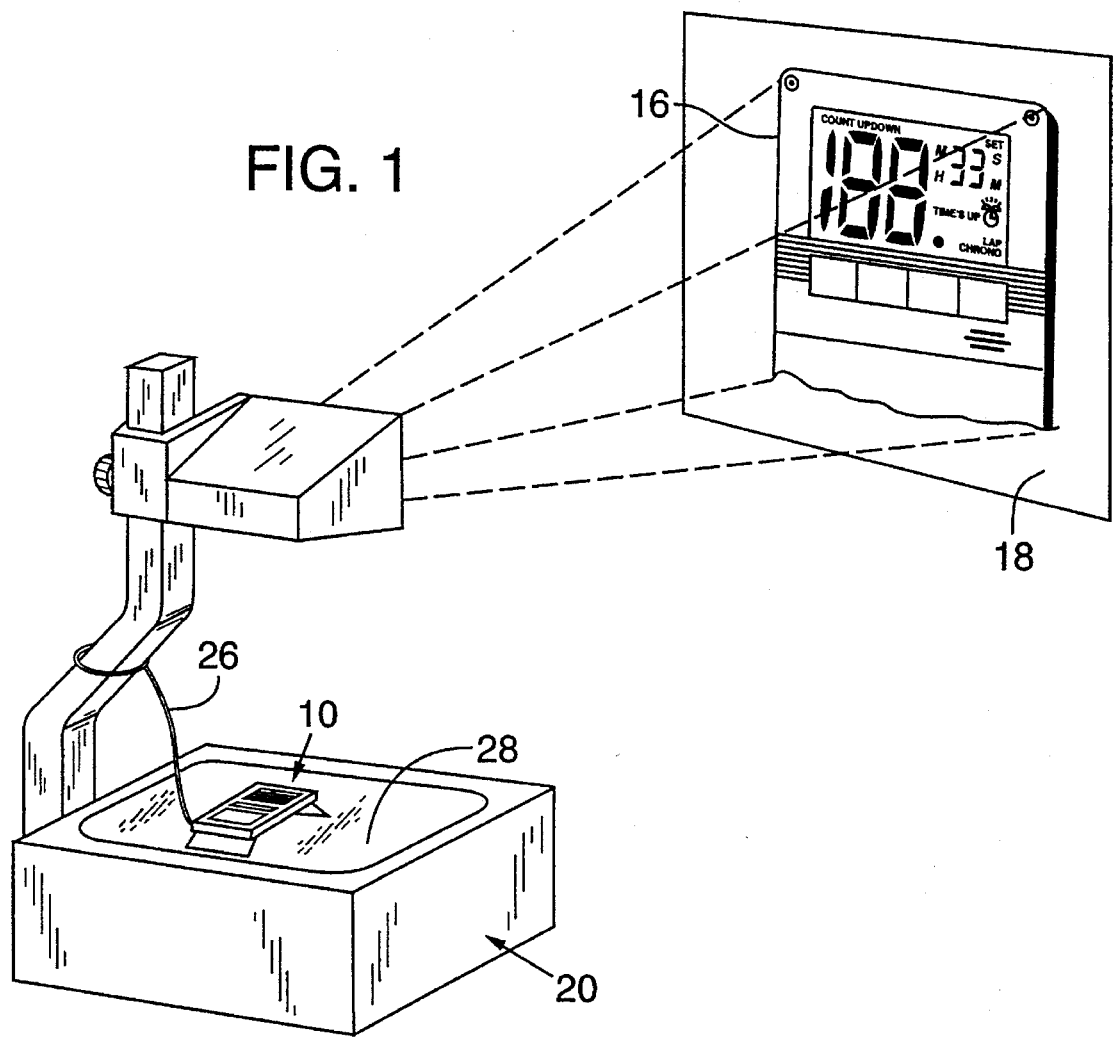
FIG. 1 is a perspective view showing a timing device for overhead projection in accordance with the present invention, as used on an overhead projector.
Figure 2:
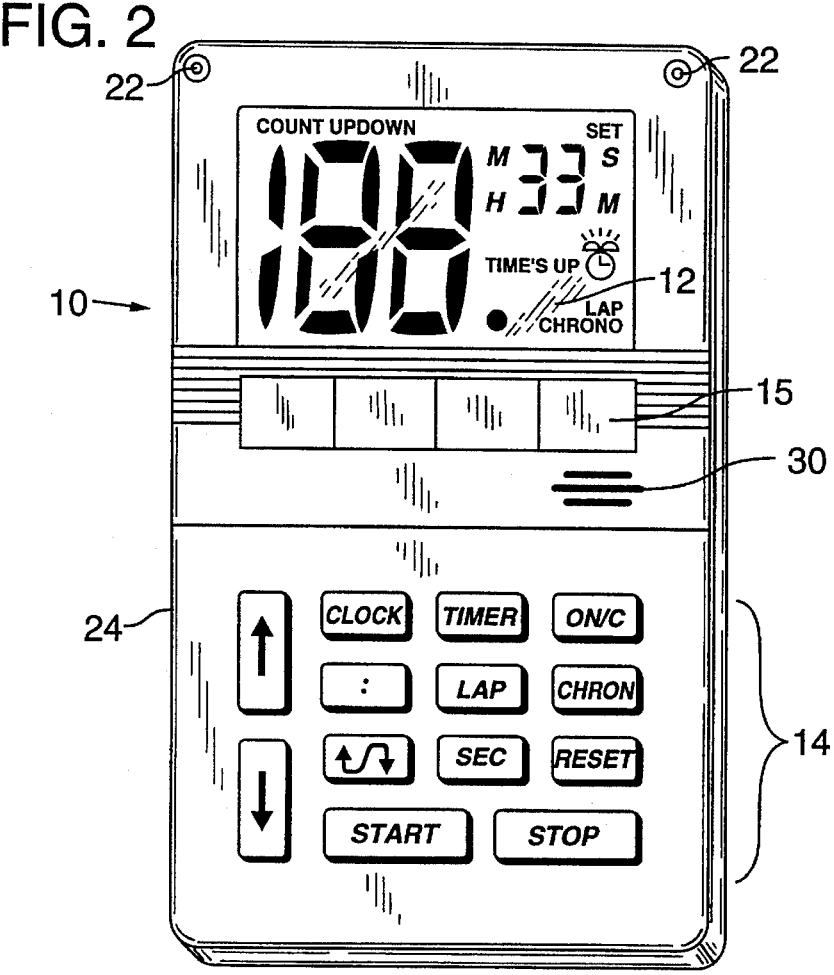
FIG. 2 is a frontal view of the timing device showing control keys and a liquid crystal display.

In the drawings, FIGS. 1 and 2 show a projectable timing device 10, including a liquid crystal display 12, function keys 14 and solar panel 15 which may be on the front panel as shown. FIG. 1 shows the timing device as used for projecting an image 16 of the LCD 12 onto a screen 18 or a wall using an overhead projector 20.

As in the calculator of U.S. Pat. No. 5,035,502, the timing device 10 of the invention may include one or more bores 22 through its casing 24, which may be at upper end corners as illustrated. These enable a tethering line or cord 26 (FIG. 1), such as a length of nylon fishing line, to be secured through one of the bores 22 and tied to a part of the table or the overhead projector 20 as illustrated in FIG. 1. This tether cord 26 helps prevent the timing device 10 from being knocked off the light stage 28 of the overhead projector 20.

In the embodiment shown in FIG. 2, the casing 24 of the timing device 10 is opaque, such that light cannot pass through the timing device 10 except through the transparent liquid crystal display 12. FIG. 2 shows the liquid crystal display 12 with all liquid crystal segments activated, only for purposes of illustration.

The function keys 14 of the timing device 10 allow the user to set the timer and to start and stop the timer, as well as to select various modes, including timer, lap, chronograph, and clock modes. Other options which can be selected include count up or count down, display of minutes/ seconds or hours/minutes, pre-alarm signal times (e.g. alarm activates when five minutes remain or when ten minutes remain), and alarm mode.

Because the casing 24 of the timing device is opaque, when the device is projected with an overhead projector 20 only the transparent LCD image will be readable on the screen 18, with the LCD image surrounded by the dark outline of the casing, as indicated somewhat schematically in FIG. 1.

The timing device 10 typically includes an audible alarm signal projected through a sound emitter 30, and activated at the end of the timing period. As noted above, the audible alarm may also serve to warn that time has almost expired. For this purpose, the audible alarm 30 can be set by the user to sound a warning tone when a specific interval of time remains. In a preferred embodiment, the specific time interval for the warning time, such as 1 or 2 minutes, is pre-programmed into the timer during manufacture. In other embodiments, the specific time interval can be set by the user via the function keys.

Figure 3:
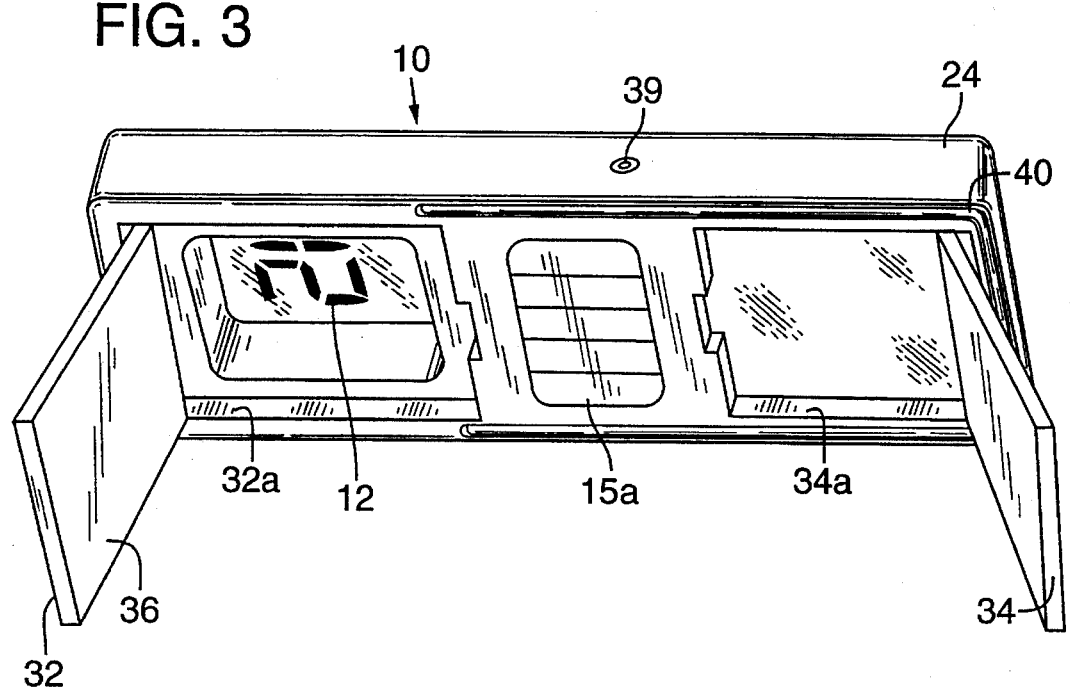
FIG. 3 is a perspective view generally from the back or bottom of the timing device.

FIG. 3 is a perspective view showing the back or bottom of the timing device 10, revealing foldable legs 32 and 34 in their extended position. In the embodiment shown, the foldable legs, when extended, are at an angle of about 10° past the vertical, which is sufficient to hold the calculator in a stable position and to resist any tendency of plastic hinges to move the panels toward closure. As described above, the foldable legs 32 and 34 serve to elevate the timing device above the projector's light stage, protecting the LCD 12 from heat generated from the overhead projector's light elements. Liquid crystal displays are sensitive to change in temperature, and can easily be damaged or caused to read erroneously by excessive heat. By elevating the liquid crystal display 12 above the light stage, the foldable legs allow air to circulate freely underneath the timing device, adequately cooling the liquid crystal display. However, the foldable legs do not hold the timer so high as to create focussing difficulties for the overhead projector 20 (if the timer is held too high this will tend to increase the minimum distance of the projector 20 from the screen for proper focus). A preferred distance of the LCD above the light table is 1 ½ inches, or more generally, in the range of one inch to two inches.

Figure 3A:
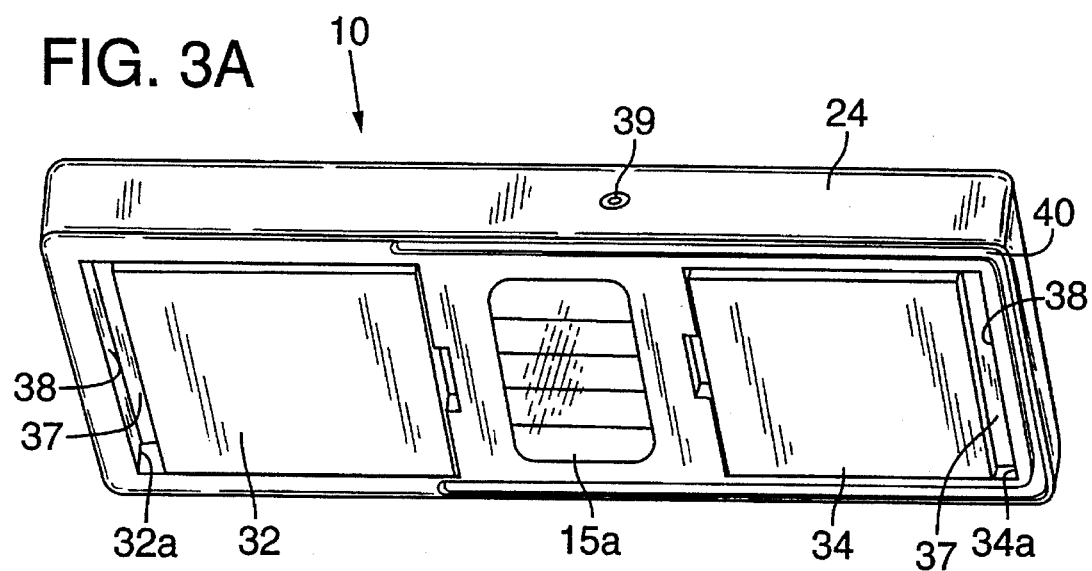
FIG. 3A is a perspective view similar to FIG. 3, showing the timing device in a different configuration.

FIG. 3A is another perspective view of the back of the timing device 10, showing the foldable legs 32 and 34 in their retracted or closed positions. In the closed position, the foldable leg 32 adjacent to the liquid crystal display 12 serves as a backing for the display, protecting the back side of the display and preventing light from passing through. The inner face of the foldable leg 32 at the LCD may include a reflective backing 36 as indicated, such that when the leg 32 is in the closed position the display 12 is backed similarly to a normal, non-transparent LCD. This reflective backing will help to enhance viewing of the liquid crystal display when it is not being used with an overhead projector 20.

As can be seen from FIGS. 3 and 3A, the foldable legs 32 and 34 may comprise plastic panels (formed of, for example, ABS material), integrally formed with a plastic hinge 37 which is a thin connector of plastic, in turn secured to structure within a respective recess 32a or 34a within which the leg panel is contained when the panel is folded to the closed position as in FIG. 3A. The case 24, in the preferred embodiment illustrated, provides a ledge or abutment 38 at each end, at the outer end of the recess 32a or 34a, acting as a stop limiting the open pivoted position of the leg panels, as shown in FIG. 3. Other forms of hinges or motion limiting stops can be used if desired.

FIGS. 3 and 3A show a rear solar panel 15a, which is preferably an alternative to the solar panel 15 shown in FIG. 2. As explained below, the position of the solar panel(s) depends on the system used for powering the timer and its alarms. Both front and rear panels can be included if desired.

Also shown in FIG. 3 is a small opening 39, which serves as an electrical plug jack for connection to a flashing strobe to be used in addition to or instead of an audible alarm signal. When the strobe is connected, the timing device 10 will activate the strobe to indicate time has expired, just as it would activate the audible alarm. The strobe attachment may be used in settings where an audible alarm is of limited use, such as in a classroom for the hearing impaired. Additionally, the flashing strobe may be used where an audible alarm is undesirable, such as in a testing environment in close quarters where a loud noise would disturb test takers.

FIGS. 3 and 3A further show a pivoted desk stand 40 which may be attached to the casing 24. The desk stand 40, which may be of metal wire, preferably folds into the body of the casing 24, as in a recess 41 provided in the back of the casing, but can be folded out to act as a stand to support the timing device in a generally upright or angled position, shown in FIG. 4. The stand 40 holds the timer in a position in which the liquid crystal display 12 can be viewed directly, allowing the timer to serve as a desk top clock when it is not employed in its capacity as an overhead projector timer.

Figure 4:
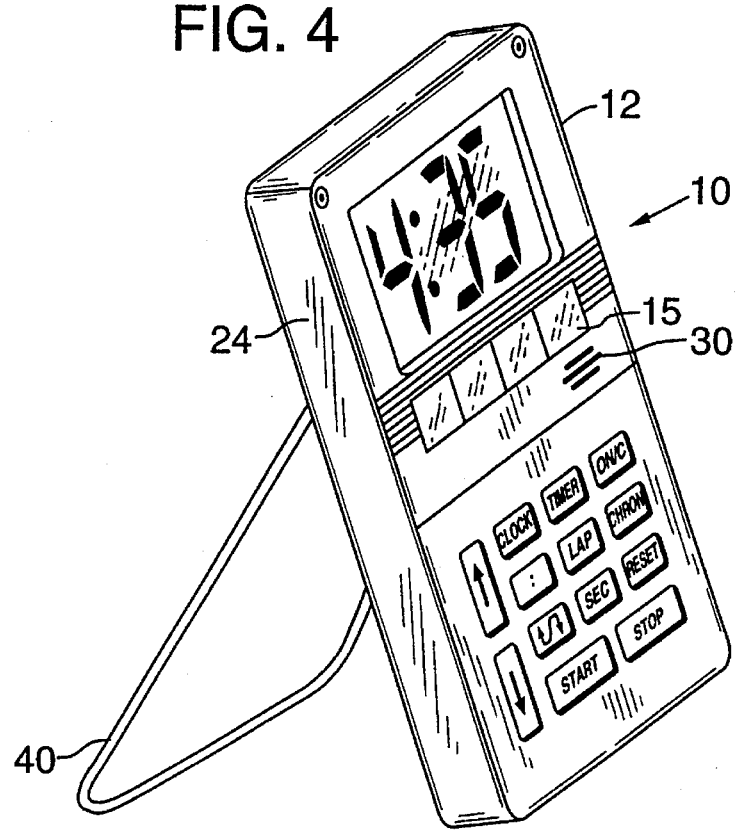
FIG. 4 is a perspective view of the timing device as used in a desk top mode.

In the embodiment shown in FIGS. 1, 2 and 4, the timing device 10 is equipped with a solar panel 15 on its upper surface. In other embodiments using solar panels, as described above, the panels may be at other locations on the calculator, such as the lower surface as shown in FIGS. 3 and 3A. Placing the solar panels on the lower surface will provide greater light exposure on the panels when the device is placed on an overhead projector, due to the light source in an OHP being directly below the timing device. This will efficiently take advantage of the strong light striking the bottom of the casing, can easily power the LCD and all clock functions, can power a limited audible alarm function, and can charge a rechargeable battery (not shown) which may be included because of the audible and/or strobe alarms.

Any of three potential arrangements may be used for powering the timer of the invention: solar panels alone (i.e. photovoltaic panels), a battery, or a combination of both, with the solar panels serving to charge the battery. The choice of power sources depends on the particular application and power requirements. For example, a timing device equipped with a strobe or audible alarm will draw relatively large amounts of energy when the alarm is activated. Other considerations include whether the timer will be used to any appreciable extent as a desk top clock or timer; in that case it is better to include the solar panel 15 in the front of the casing where presumably more light is available.

Figure 5:
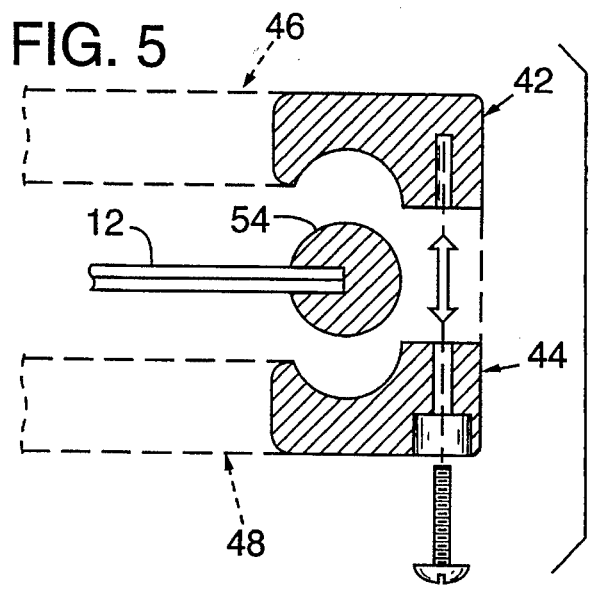
FIG. 5 is an exploded cross-sectional elevation view indicating the mounting of the liquid crystal display between panels of the timing device.

FIG. 5 is an exploded cross-sectional view showing some details of construction of a preferred embodiment of the timer 10. The casing is largely composed of a front panel 42 and a back panel 44, with the front and back panels 42 and 44 having openings 46 and 48 for the liquid crystal display 12. Liquid crystal displays include glass panels and tend to be fragile and subject to breakage. To protect the liquid crystal display 12, the LCD is mounted between the front and back panels 42 and 44 with a mounting gasket or shock absorbing ring 54 around its edges, to be engaged between the casing panels 42 and 44, in grooves 55, on assembly. The mounting gasket 54, preferably formed of a rubbery resilient material such as neoprene, protects the fragile LCD from breakage by absorbing shocks to which the casing may be subjected.

Figure 6:
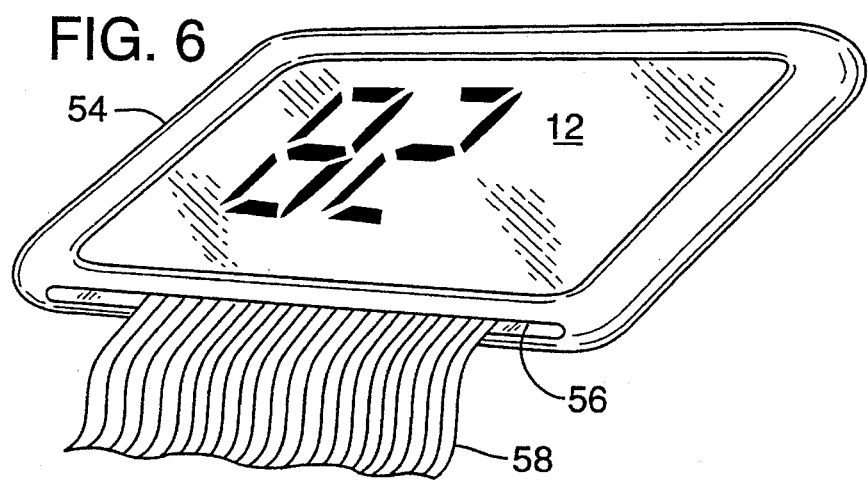
FIG. 6 is a perspective view of the liquid crystal display and a mounting gasket or shock absorbing frame, prior to assembly in the timing device.
Figure 7:
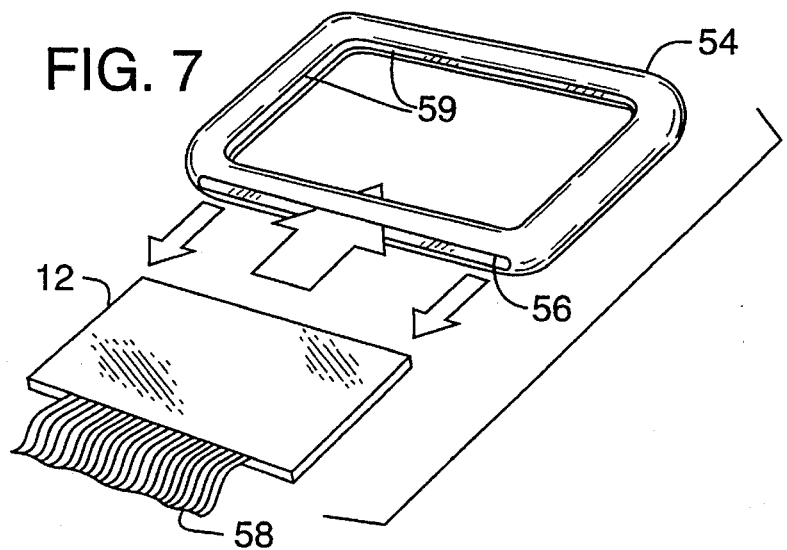
FIG. 7 is an exploded perspective view of the liquid crystal display and mounting gasket, indicating assembly.

As shown in FIGS. 6 and 7, the mounting gasket 54 covers the edges of the LCD, fitting closely over them. In the embodiment shown, the mounting gasket 54 is grooved on three sides and has a slot 56 on the fourth side, through which an electrical conducting ribbon 58 passes. During assembly, the liquid crystal display 12 is slid into the gasket 54 through the slot 56, as shown in FIG. 7, and is nested into the grooves 59 at the sides and back of the gasket.

In one preferred embodiment of the timing device of the invention, it has three operational modes. Operational characteristics of one specific embodiment are listed below, with reference to the timer face as represented in FIG. 2. The functions of these modes are similar to many commonly available watches and timing devices, such as, for example a Timex Triathlon sports watch sold by Timex Corporation, incorporating most of these functions. Other watches and timers have incorporated the remaining features and functions, and in any event, carrying out the electronics to produce all the described functions in an electronic timer is well within the skill of those in the electronic timer field.

1) Clock Mode

Select Clock Mode: Press "CLOCK" key to enter clock mode.

(Note: Clock mode is the default mode. If the device is left in timer or chrono mode, is not running, and no keys are pressed, it will return to clock mode after 10 minutes.)

Set Time: Use ":" key to set hours, mins., press "START"

Select 12 or 24 Hour Display: Press "↵" key to select.

Viewing Clock When Timer Or Chrono in Use: Press "CLOCK" to display time or day. Display will return to TIMER or CHRONO after "CLOCK" key is released.

2) Timer Mode

Select Timer Mode: Press "TIMER" key.

Set Time: Use "↑", "↓", and "SEC" keys to set time.

Select Countdown or Countup: Press "↵" for countup (otherwise will automatically countdown).

Start Timer: Press "START" key.

Stop Timer Temporarily: Press "STOP" key, then "START" key to resume.

Pre-alarm signals will go off (if preset) At T=0, display flashes "TIME'S UP" and alarm is activated.

Reset Timer (to original time setting): Press "RESET".

Return to Clock Mode: Press "CLOCK" key.

3) Chronograph Mode

Select Chrono Mode: Press "CHR" key.

Start Chronograph: Press "START" key.

Freeze Display w/Chrono Still Running: Press "LAP" key, then press "LAP" key again to unfreeze the display.

Stop Chronograph: Press "STOP" key. (Press "START" key to restart chronograph from stopped time.)

Reset Chronograph to 0: With Chronograph stopped, press "RESET" key.

Return to Clock Mode: Press "CLOCK" key.

The above described preferred embodiments illustrate the principles of the present invention, but are not intended to limit the scope of the invention. Other embodiments and variations to these preferred embodiments will be apparent to those skilled in the art and may be made without departing from the scope of the invention as defined in the following claims.

I claim:

1. A projectable timing device for use on an overhead projector, comprising:

a casing, clock timing means in the casing for clocking progression of time for a selected interval, clock set means on the casing for enabling a user to select and set a desired interval of time on the clock timing means, with activation means on the casing for enabling the user to start the time interval, a liquid crystal display in the casing, connected to the clock timing means so as to display the setting of the desired interval of time as well as the progression of time over the selected interval, the liquid crystal display being transparent through the casing so as to be projectable with an overhead projector when the casing is positioned over a light stage of the overhead projector, and the casing including elevating means for supporting the casing at an elevated position above the light stage of the overhead projector, staged sufficiently above the light stage to allow air to circulate between the liquid crystal display and the light stage to the extent that the display is cooled and prevented from overheating from the heat of the light stage, the elevating means comprising a plurality of foldable legs connected to the casing such that the legs may be stored flat against a back side of the casing or opened to form leg supports, whereby the start, progression and end of a timing interval may be displayed to a classroom for group.

2. The timing device of claim 1, wherein the foldable legs include one leg in the form of a panel hingedly connected at the back of the casing in a position to cover the back of the liquid crystal display when folded against the casing.

3. The timing device of claim 2, wherein the foldable leg panel has a reflective surface facing toward the liquid crystal display in position to provide a reflective backing behind the display, whereby the device can be used as a non-projected timing device viewable from the front of the display.

4. The timing device of claim 3, wherein the clock timing means includes chronometer means for displaying time of day on the liquid crystal display and clock select means enabling a user to select a chronometer function wherein time of day is displayed, whereby the device can be used as a desk clock.

5. The timing device of claim 3, further including desk stand means on the casing having a storage position and a deployed position, for supporting the timing device in a generally standing-up position on a horizontal surface when in said deployed position.

6. A projectable timing device for use on an overhead projector, comprising:

a casing, clock timing means in the casing for clocking progression of time for a selected interval, clock set means on the casing for enabling a user to select and set a desired interval of time on the clock timing means, with activation means on the casing for enabling the user to start the time interval, a liquid crystal display in the casing, connected to the clock timing means so as to display the setting of the desired interval of time as well as the progression of time over the selected interval, the liquid crystal display being transparent through the casing so as to be projectable with an overhead projector when the casing is positioned over a light stage of the overhead projector, and desk stand means on the casing having a storage position and a deployed position, for supporting the timing device in a generally standing-up position on a horizontal surface when in said deployed position, whereby the timing device can serve as a desk top timer when not used on an overhead projector, whereby the start, progression and end of a timing interval may be displayed to a classroom or group.

7. The timing device of claim 6, wherein the clock timing means includes chronometer means for displaying time of day on the liquid crystal display and clock select means enabling a user to select a chronometer function wherein time of day is displayed, whereby the device can be used as a desk clock.

8. The timing device of claim 7, further including LCD backing means for selectively placing a reflective backing behind the liquid crystal display, for enhancing the display when used as a desk clock.

9. The timing device of claim 8, wherein the LCD backing means comprises a panel mounted pivotally on the back of the casing.

10. A projectable timing device for use on an overhead projector, comprising:

a casing, clock timing means in the casing for clocking progression of time for a selected interval, clock set means on the casing for enabling a user to select and set a desired interval of time on the clock timing means, with activation means on the casing for enabling the user to start the time interval, a liquid crystal display in the casing, connected to the clock timing means so as to display the setting of the desired interval of time as well as the progression of time over the selected interval, the liquid crystal display being transparent through the casing so as to be projectable with an overhead projector when the casing is positioned over a light stage of the overhead projector, and signal means associated with the clock timing means, for activating an alarm signal means at the end of the timing interval, the alarm signal means comprising a visual alarm signal, whereby the start, progression and end of a timing interval may be displayed to a classroom or group.

11. The timing device of claim 10, wherein the visual alarm signal comprises a flashing strobe light.

12. A projectable timing device or use on an overhead projector, comprising:

a casing, clock timing means in the casing for clocking progression of time for a selected interval, clock set means on the casing for enabling a user to select and set a desired interval of time on the clock timing means, with activation means on the casing for enabling the user to start the time interval, a liquid crystal display in the casing, connected to the clock timing means so as to display the setting of the desired interval of time as well as the progression of time over the selected interval, the liquid crystal display being transparent through the casing so as to be projectable with an overhead projector when the casing is positioned over a light stage of the overhead projector, and shock resistant support means securing the liquid crystal display to the casing comprising a resilient mounting gasket around the edges of the liquid crystal display, the casing including front and back panels with an opening for the display, the front and back panels being assembled together to engage the mounting gasket between them so as to retain the liquid crystal display in place in the casing, whereby the start, progression and end of a timing interval may be displayed to a classroom or group.

13. The timing device of claim 12, wherein the front and back panels each include a groove on their inside surfaces, positioned around the opening for the display so as to engage the mounting gasket in the groove on assembly of the front and back panels together.

14. A projectable timing device for use on an overhead projector, comprising:

a casing, clock timing means in the casing for clocking progression of time for a selected interval, clock set means on the casing for enabling a user to select and set a desired interval of time on the clock timing means, with activation means on the casing for enabling the user to start the time interval, a liquid crystal display in the casing, connected to the clock timing means so as to display the setting of the desired interval of time as well as the progression of time over the selected interval, the liquid crystal display being transparent through the casing so as to be projectable with an overhead projector when the casing positioned over a light stage of the overhead projector, and solar panel means on the casing for powering the clock timing means and the liquid crystal display, the solar panel means being located on the back side of the casing, exposed to the light stage when used on an overhead projector, whereby the start, progression and end of a timing interval may be displayed to a classroom or group.

\* \* \* \* \*

UNITED STATES PATENT AND TRADEMARK OFFICE
CERTIFICATE OF CORRECTION

PATENT NO. : 5,590,944
DATED : January 7, 1997
INVENTOR(S) : William T. Stokes

It is certified that error appears in the above-indentified patent and that said Letters Patent is hereby corrected as shown below:

Column 7, line 41, change "staged" to --spaced--.
Column 7, line 50, change "for" to --or--.

Signed and Sealed this

Fifteenth Day of July, 1997

Attest:

Attesting Officer

BRUCE LEHMAN

Commissioner of Patents and Trademarks